Oct. 23, 1934.　　　　E. C. EBERTS　　　　1,978,078
METHOD OF PRODUCING TOMATO PRODUCTS
Filed June 22, 1933
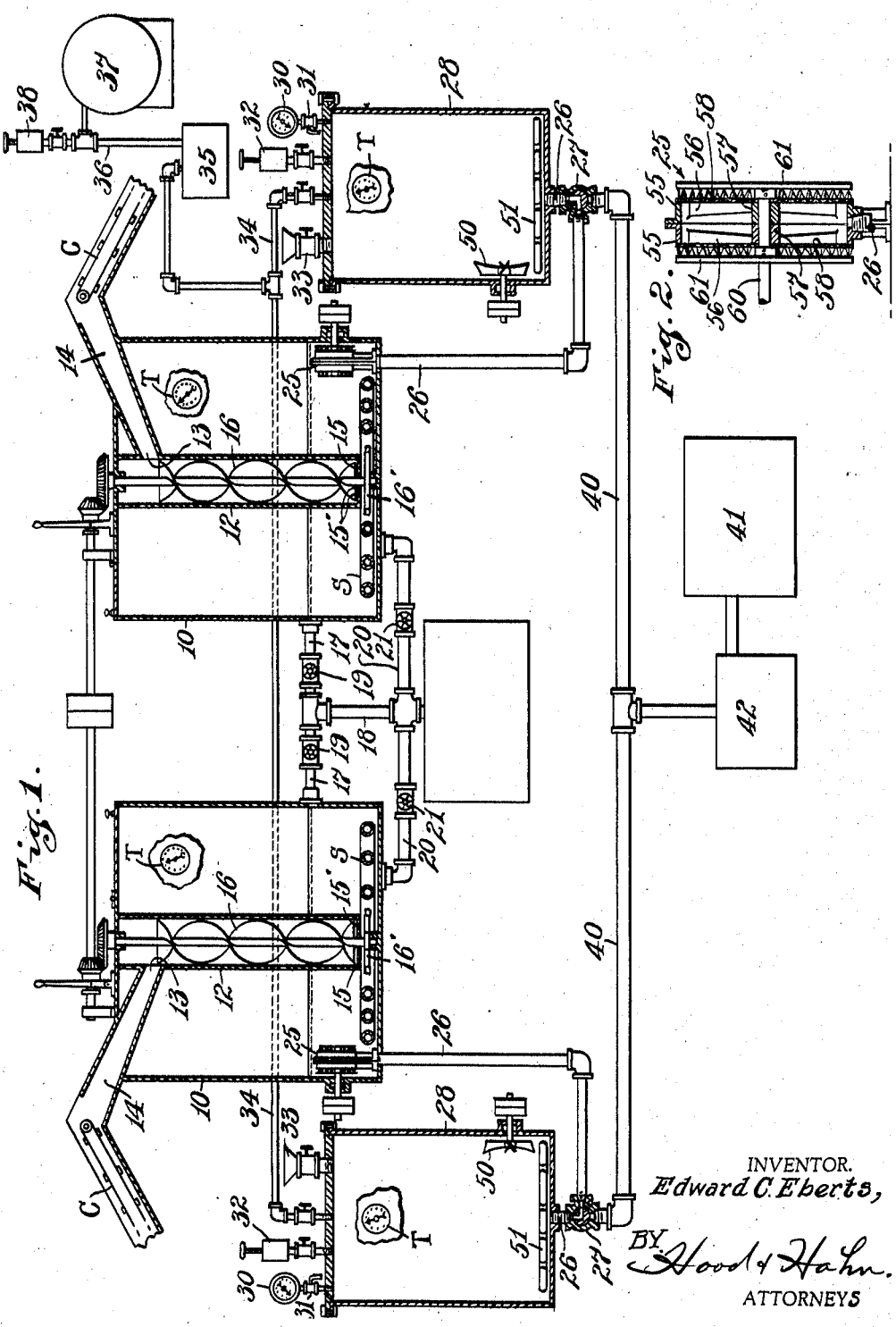
INVENTOR.
Edward C. Eberts,
BY Hood & Hahn.
ATTORNEYS Patented Oct. 23, 1934

1,978,078

UNITED STATES PATENT OFFICE 1,978,078

METHOD OF PRODUCING TOMATO PRODUCTS

Edward C. Eberts, Jeffersonville, Ind.

Application June 22, 1933, Serial No. 677,110

2 Claims. (Cl. 99—11)

Tomato juice intended to be packaged for interstate commerce must, of course, comply with Government regulations that it shall be an "unconcentrated pasteurized product consisting of a liquid, with a substantial portion of the pulp, expressed from ripe tomatoes". A product answering to the above definition is not necessarily either stable or as finely flavored as it may be.

It is well known that juices of fresh tomatoes contain vitamins A, B and C and that, when such juices are produced by substantial crushing of the fruit by the usual methods in order to obtain a juice having a commercially acceptable solid content, there is a rapid flavor deterioration and loss of vitamin content, particularly vitamin C, before the juice can be commercially packaged, and that, in many instances, the solid content of the extracted juice has a decided tendency to separate from the liquid.

When tomatoes are crushed the cells, within which the enzymes are naturally sealed, are broken and the freshly liberated enzymes, in the presence of oxygen, apparently very actively and quickly cause or stimulate a change of the pectin to pectic acid and, as a result, a substantial vitamin content appears to be destroyed.

Apparently, also, the development of pectic acid substantially diminishes the ability of the solid content to remain suspended uniformly in the liquid body.

I have discovered a new process for treating fresh tomatoes, the practice of which results in protecting the pectin from substantial change into pectic acid and in thereby preserving a larger proportion of the vitamin content and a substantial elimination of tendency of the solid content to separate from the liquid.

I have also devised new apparatus by means of which my improved process may be practiced on a commercial scale at low cost.

As a result of my newly discovered process the total bulk of pulp (sans skins and seeds if desired) obtainable from a given quantity of raw fruit and available for preservation as pulp or for use in producing catsup, chili sauce, etc., and total bulk of beverage juice (having a commercially acceptable nonseparating solid content) available for packaging, are considerably greater than have been obtainable by previously known processes.

The flavor of both juice and pulp is also decidedly better and more nearly that of the raw fruit, and the vitamin content is more nearly that of the raw fruit.

The increase of available bulk is apparently due to a jellying action attributable to the preservation of the pectin and avoidance of development of pectic acid.

My new process involves, primarily, crushing of each fruit after and during complete submergence in a body of pulp and juice which is maintained at a temperature, (say about 180 to 190 degrees Fahr.) which is sufficiently above normal atmospheric temperatures to discourage enzyme reactions.

My past experience indicates that the most desirable temperature range is below 212° F. and above 150° F.

It is commercially impossible, or impracticable, to avoid all mashing or breaking of the fruit during the necessary preliminary handling in picking, transporting, washing and steaming, but it is advisable to exercise as much care as possible, during these preliminary steps, to avoid rupture of the fruit.

After the fruit has been washed, selected, graded and stemmed, it is promptly submerged in a bath comprising a substantial body of juice and pulp at super-normal temperature, as stated above, whereupon the heated fruit, while still submerged, is crushed by expression through a perforated plate. The bath is preferably continuously stirred and preferably by means which will avoid, as much as practicable, material splashing of the upper surface so as to minimize air absorption.

The temperature of the bath is maintained by added heat.

If desired, the bath during a long run may be maintained at a substantially constant level by overflowing pulp from near the top of the bath and extracting juice from the lower region of the bath, or by concurrent extraction of mixed pulp and juice for ultimate separation elsewhere, but I have found in practice that more accurate and satisfactory results may be obtained by an alternate batch operation which will furnish a substantially uniform supply of pulp (for treatment by a finisher to remove undesired skins, etc.) and beverage juice to be delivered to packaging machines.

Care should be exercised throughout the practice of the process to eliminate, as far as possible, possibility of absorption of air.

The accompanying drawing illustrates, somewhat diagrammatically my new apparatus which has proven to be commercially satisfactory in the practice of my improved method.

Fig. 1 is a general diagram, in the nature of a flow sheet, in partial vertical section, and Fig. 2 is a vertical section of a suitable juice extractor. The term juice is here used to designate a drinkable mixture containing a substantial quantity of tomato solids in finely divided state.

In the drawing 10, 10 indicates two primary vats or tanks of convenient capacity, say 750 gallons, each provided with suitable covers which will permit access to the interior, and with suitable heating means, such as a steam coil S.

Depending into each vat is a tube 12 having near its upper end an inlet 13 adapted to receive fresh fruit from a hopper 14 to which the fruit is delivered by a conveyor C leading from the washing apparatus (not shown). Tube 12 extends to a level near the bottom of the vat and at its lower end is provided with a bottom plate 15 which is perforated by a large number of comparatively small perforations 15′ which are preferably funnel shaped.

Rotatably mounted in each tube 12 is a spiral conveyor flight 16 formed to receive the fruit as it arrives through inlet 13, promptly submerge it in the liquid contents of the vat, and carry it to and force it through the perforations 15′, thereby reducing the fruit to a mixture of pure juice, a desirable portion of pulp which will remain suspended in the juice, and a remainder of pulp, seeds, and skins (and stems if any), which will rise to the top of the fruit body.

A drain pipe 17 leads from each vat 10, at a level sufficiently above the lower end of tube 12 to insure an adequate depth of bath in the vat for proper submergence of the first-arriving fruit of a succeeding batch, and these pipes 17 conveniently deliver to the pump outflow pipe 18 through valves 19. Each vat is also provided with a supplemental drain 20 which leads through valve 21 to pipe 18 in order that each vat may be completely drained when desired.

Arranged at the bottom of each vat is a juice extractor 25 provided with a discharge pipe 26 which leads, through a three-way valve 27, to a juice tank 28.

For a number of operating reasons I have found that it is apparently better to have a separate juice tank for each of the vats 10 and these juice tanks should be preferably porcelain lined or glass lined. Each juice tank is provided with a cover by which the tank may be hermetically sealed, said cover being preferably provided with a suitable man-hole, not shown, by which access may be had to the interior. Each juice tank 28 is provided with a pressure gage 30, its connection with the tank being conveniently provided with a hand-controlled valve 31. Each juice tank is also provided with a controllable venting valve 32, and is also preferably provided with a valve 33 through which desired condiments may be injected into the tank without substantially breaking the sub-atmospheric pressure which may exist in the tank.

Leading from each juice tank is a pipe 34, the outer end of which is connected to a vacuum chamber 35, preferably having a capacity considerably in excess of the capacity of either juice tank, and connected by a pipe 36 with a vacuum pump 37. An automatic differential 38 is interposed between chamber 35 and pump 37 so as to automatically limit the minus pressure which may be induced in the system.

Leading from each valve 27 is a discharge pipe 40 which leads to a packaging machine 41, either directly or through an homogenizer or viscolizer 42.

Each juice tank 28 is provided with a mechanical stirrer 50 and with suitable heating means, such for instance as the heating coil 51. The vats 10, 10 and tanks 28, 28 are each provided with a suitable thermometer T.

The juice extractor, which I have found to be highly efficient, is illustrated in Fig. 2 and comprises a pair of mating rings 55, 55 having inwardly-extending radial arms 56 which support a central journal bearing 57. The outer end of each ring 55 is covered by a fine screen 58 of approximately 0.023 round openings. These openings are formed as closely as practicable through a metal sheet, approximately 28 gage, unaffected by the juice, such as Monel metal. Journaled in the above-mentioned bearings is a shaft 60 carrying a pair of brushes 61, 61 which engage the outer faces of the screens 58. The shaft 60 is projected through the wall of tank 10 and provided at its outer end with means by which the brushes may be swept over the screens at desired speed to prevent clogging.

The spiral conveyors 16 are provided with suitable driving trains, shown diagrammatically, by means of which they may be driven.

The shaft of each conveyor 16 is extended down through the perforated plate and provided with radially-extending stirrer arms 16′ so formed as to act to keep the contents of the vat in constant movement, but without substantial splashing at the upper surface.

The operation is as follows:

Suitable contents of hot tomato pulp and juice having been established in vats 10, 10, fresh tomatoes are delivered to the upper end of the conveyor 16 of one of the vats and by that conveyor promptly submerged in the hot mass and carried thence downwardly and pressed through the perforations 15′, the arrangement being such that all substantial breaking of the cells of the fruit takes place only after said cells are submerged in the hot bath.

When the bath has been sufficiently augmented the adjacent tank 28 will be connected to vacuum chamber 35 so that the major quantity of air in that tank 28 will be removed, whereupon the appropriate valve 27 is shifted to connect with the adjacent extractor 25, whereupon the juice, which passes through screens 58, will flow into the appropriate tank 28. In the meantime fresh fruit is fed to the other vat.

I have found in practice that, as the juice passes through screens 58, a vaporization takes place which tends to gas-log the separator, and therefore that maintenance of a desired vacuum, during the transfer time, in tank 28, performs the second function of drawing these vapors away from the interior of the juice extractors, thereby very materially speeding up juice extraction. After a desired quantity of juice, with its entrained solids, has ben extracted from tank 10, the appropriate valve 27 is shifted to connect the transfer tank with the filling mechanism, through pipe 40, the appropriate valve 33 is closed to disconnect this juice tank from the vacuum chamber, and the appropriate valve 32 is set so as to break the vacuum in the filled tank 28 sufficiently to permit outflow of the finished juice at a desired rate.

The juice as it flows into the juice tank is stirred and heated so that there is a considerable amount of vaporization which acts to promptly displace any free oxygen which has been in the tank. As a consequence, any absorption of oxygen by the juice in the juice tank is avoided during the period while the tank is being filled.

During the period of outflow, air is admitted into the transfer tank but at this time the surface of the content is substantially quiescent and the possibility of air absorption is reduced to negligible amount.

I claim as my invention:

1. The process of producing tomato products which includes the establishment of a pool of tomato juice and pulp, maintaining said pool at a temperature between 150° F. and 212° F., submerging fresh tomatoes in said pool and thereafter while so submerged pressing said tomatoes into small portions, and thereafter separating part of said pool into a beverage comprising tomato liquor and finely divided pulp, and a residue of larger pulp.

2. The process of producing tomato products which includes the establishment of a pool of tomato juice and pulp, maintaining said pool at a temperature between 150° F. and 212° F., submerging fresh tomatoes in said pool and thereafter while so submerged pressing said tomatoes into small portions, thereafter separating from said pool through a fine screen tomato liquor and entrained finely divided pulp by subjecting the delivery side of said screen to a subnormal pressure to withdraw accumulating tomato vapors with the aforesaid liquor, discharging said separated liquor, entrained fine pulp and vapors into a sealed container and currently withdrawing said vapors, and thereafter depositing portions of said liquor and entrained fine pulp into smaller containers.

EDWARD C. EBERTS.